Figure 1:
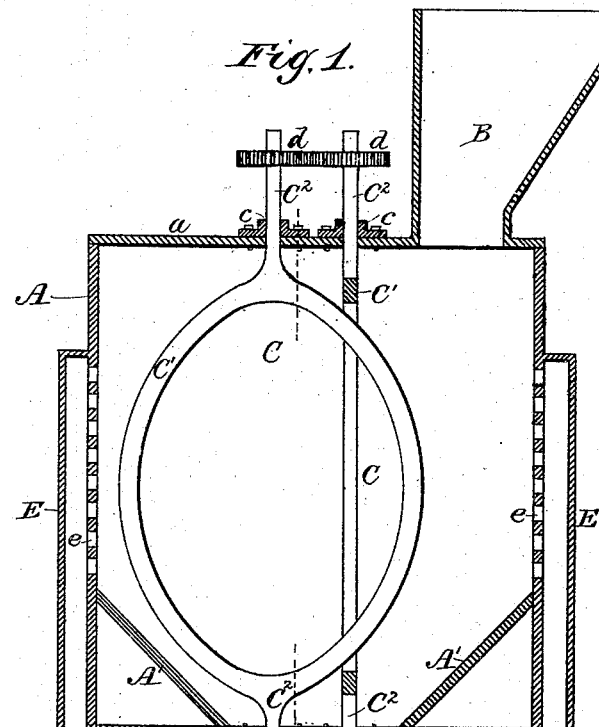

(No Model.)

T. T. CRANE & J. G. SANDERSON.
WALLKILL ROOFING CEMENT.

No. 274,178. Patented Mar. 20, 1883.

Witnesses:
K. Lockwood French
Miller C. Earl

Inventors:
Theodore T. Crane
J. Gardner Sanderson,
by his Attorney,
Frank L. Pope

UNITED STATES PATENT OFFICE.

THEODORE T. CRANE, OF HACKENSACK, NEW JERSEY, AND JAMES GARDNER SANDERSON, OF SCRANTON, PENNSYLVANIA.

WALLKILL ROOFING-CEMENT.

SPECIFICATION forming part of Letters Patent No. 274,178, dated March 20, 1883.

Application filed May 25, 1882. (No model.)

*To all whom it may concern:*

Be it known that we, THEODORE T. CRANE and J. GARDNER SANDERSON, citizens of the United States, residing respectively at Hackensack, in the county of Bergen and State of New Jersey, and at Scranton, in the county of Luzerne and State of Pennsylvania, have jointly invented a new and useful article of manufacture, called "Wallkill Roofing-Cement," of which the following is a specification.

The object of our invention is to provide a cement adapted, by reason of its imperviousness to moisture and its capacity for withstanding the effects of atmospheric changes, for protecting the roofs of buildings and rendering them water-tight, as well as for lining cisterns and reservoirs, and other similar purposes.

The invention consists in combining with the ordinary hydraulic cement of commerce sulphur in certain porportions, forming a compound to which mineral pitch is afterward added.

In carrying out our invention we prefer to employ a variety of hydraulic cement commonly known as "Portland cement," to each sixty parts of which, by weight, one part of sulphur is added. Both the cement and the sulphur may be reduced to a pulverulent condition before they are mixed. The sulphur is in this case preferably in the form of powdered brimstone or of flour of sulphur; or the uncrushed brimstone may be mixed with the cement before grinding, and the two together reduced to a finely-divided state. In either case the two constituents are to be thoroughly mixed together by some suitable mechanical device—such, for example, as that hereinafter described. The mixture thus prepared is designed to be incorporated with bitumen, asphalt, coal-tar, or any other suitable form of "mineral pitch," so called, for rendering it plastic and impervious to moisture. In adding the tar or pitch to the mixture of hydraulic cement and sulphur the former substance is heated slowly in a suitable vessel until melted, and is thereafter maintained at the lowest temperature which will suffice to keep it in a liquid condition. While in this state the pulverulent mixture of cement and sulphur is gradually added, and thoroughly incorporated therewith, by stirring, until the mass attains a proportion of about one hundred parts, by weight, of the tar or pitch to one hundred and eighty-three parts of the powder, these being the proportions from which we have thus far secured the best results. This exact proportion is, however, not essential, and may be varied within certain limits, as found desirable for different purposes, or for different temperatures to which it is to be exposed. The roofing-cement thus formed is applied to the surface to be protected, while still in a plastic or molten condition, preferably by the aid of a brush or mop or other like implement, and is then allowed to cool or harden. In applying the cement to a roof the surface is preferably covered, in the first place, with a suitable roofing-paper, after which the cement compound is spread evenly over the entire surface, and worked into the paper and crevices before it cools sufficiently to harden. While it is still in a somewhat plastic condition fine, sharp sand may be sifted or sprinkled over the surface of the cement, which, becoming more or less embedded therein, produces a tough and durable surface. The coating thus formed is not liable to become cracked by the action of varying temperature, inasmuch as it is, to a certain extent, yielding and flexible in its nature, nor will it be softened by exposure to the rays of the sun.

In practice it is usually found convenient and desirable to manufacture and sell the powdered cement mixture separately, the mineral pitch being added when the cement is to be applied, as some suitable bituminous product—such as gas-tar—may usually be readily obtained in the vicinity of the locality. The complete mixture may, however, be prepared for transportation by manufacturing it in the manner hereinbefore described, and allowing it to cool in blocks of convenient size and form.

As it is essential that the mixture of the hydraulic cement and sulphur should be very thorough, we have devised a machine especially adapted to secure this result.

Figure 2:
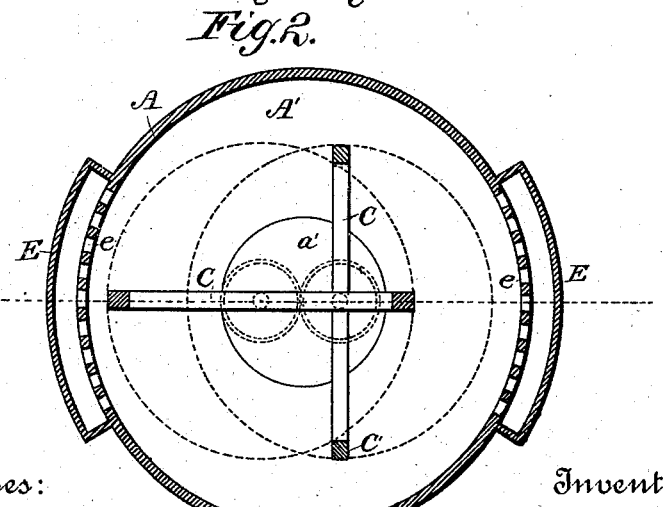

In the accompanying drawings, Figure 1 represents a vertical section, and Fig. 2 a horizontal section, of such a machine.

Referring to the drawings, A represents a cylindrical box or chamber, closed at both ends by suitable top and bottom pieces, a a'. A hopper, B, is provided at the top of the cylinder A, through which the materials are supplied thereto. Two parallel revolving beaters, C C, each consisting of a ring or oval-shaped band, C', are provided at each end with an extension or arm, C², which arms are supported in suitable bearings, c c c' c', at the top and bottom of the cylinder A. They are provided with suitable toothed wheels, d d, and are geared together in such a manner as to describe, in revolving, circles which intersect each other, as indicated by the dotted lines in Fig. 2.

The apparatus may be caused to revolve by means of any convenient motor acting upon one of its axes by a toothed wheel or a pulley.

Upon opposite sides of the cylinder A a number of perforations, e, are provided, through which the commingled material gradually escapes from the cylinder. The size of these perforations depends upon the rapidity with which it is desired to allow the material to discharge.

Suitable shields, E, extend downward from above the discharge-openings, parallel with the sides of the cylinder, for the purpose of guiding the material, as it escapes from the cylinder, into any required receptacle.

For the purpose of avoiding the accumulation of the material within the cylinder, we provide a false bottom consisting of a funnel-shaped section, A', placed at the bottom of the cylinder, and covering the corner formed by the union of the base a' with the cylinder A.

The movement of the beaters C C through the intersecting circles renders it well suited to secure a thorough incorporation of the materials.

We claim as our invention—

The hereinbefore-described cement, called "Wallkill roofing-cement," consisting of hydraulic cement and sulphur, combined in substantially the proportions set forth.

In testimony whereof we have hereunto subscribed our names this 20th day of May, A. D. 1882.

THEODORE T. CRANE.
JAMES GARDNER SANDERSON.

Witnesses:
C. S. COWAN,
WM. AMORY, Jr.